US010790916B2

United States Patent
Guarin Aristizabal et al.

(10) Patent No.: US 10,790,916 B2
(45) Date of Patent: Sep. 29, 2020

(54) WIRELESS COMMUNICATION UNIT, INTERFERENCE DETECTION CIRCUIT AND METHOD FOR INTERFERENCE DETECTION

(71) Applicant: NXP B.V., Eindhoven (NL)

(72) Inventors: Gustavo Guarin Aristizabal, Munich (DE); Arnaud Sion, Munich (DE); Ralf Reuter, Landshut (DE); Marcel Welpot, Munich (DE)

(73) Assignee: NXP B.V., Eindhoven (NL)

( * ) Notice: Subject to any disclaimer, the term of this patent is extended or adjusted under 35 U.S.C. 154(b) by 59 days.

(21) Appl. No.: 15/906,111

(22) Filed: Feb. 27, 2018

(65) Prior Publication Data

US 2018/0262283 A1    Sep. 13, 2018

(30) Foreign Application Priority Data

Mar. 10, 2017    (EP) .................................. 17160370

(51) Int. Cl.
| | |
|---|---|
| *H04B 17/345* | (2015.01) |
| *G01S 7/35* | (2006.01) |
| *G01S 7/285* | (2006.01) |
| *G01S 7/02* | (2006.01) |

(52) U.S. Cl.
CPC ............ *H04B 17/345* (2015.01); *G01S 7/023* (2013.01); *G01S 7/285* (2013.01); *G01S 7/352* (2013.01)

(58) Field of Classification Search
CPC .................................................... H04B 17/345
See application file for complete search history.

(56) References Cited

U.S. PATENT DOCUMENTS

| | | |
|---|---|---|
| 6,411,253 B1 | 6/2002 | Cox et al. |
| 7,463,704 B1 | 12/2008 | Tehrani et al. |
| 9,063,213 B2 | 6/2015 | Himmelstoss et al. |
| 2007/0018886 A1 | 1/2007 | Watanabe et al. |

(Continued)

FOREIGN PATENT DOCUMENTS

EP    3070490 A1    9/2016

*Primary Examiner* — Kodzovi Acolatse
*Assistant Examiner* — Farhad Ali

(57) ABSTRACT

A wireless communication unit (100) is described that comprises: at least one receiver configured to receive a radio frequency signal on at least one receiver channel (262, 264, 266, 268) and comprising a plurality of receiver circuits; at least one interference detection circuit (244, 248, 252) coupled to an output of at least one of the plurality of receiver circuits and configured to detect a saturation event of a signal output from the at least one of the plurality of receiver circuits; and a controller (114) configured to identify interference in a received signal. The at least one interference detection circuit (244, 248, 252) comprises at least one counter (118) configured to count a number of saturation events in at least one of the plurality of receiver circuits over a time limited period; and at least one comparator (202, 212, 222) coupled to the at least one counter (118) and configured to compare a count value of the number of saturation events from the at least one counter (118) with a counter threshold to indicate a presence of interference in the signal, when the counter threshold is exceeded.

16 Claims, 5 Drawing Sheets

(56) References Cited

U.S. PATENT DOCUMENTS

| | | | |
|---|---|---|---|
| 2008/0001666 A1* | 1/2008 | Szepesi | H03F 3/343 330/255 |
| 2008/0013655 A1 | 1/2008 | Cho et al. | |
| 2010/0034327 A1* | 2/2010 | Rimini | H03G 3/3052 375/345 |
| 2016/0154092 A1* | 6/2016 | Pavao-Moreira | H03K 19/01750 342/175 |

* cited by examiner

WIRELESS COMMUNICATION UNIT, INTERFERENCE DETECTION CIRCUIT AND METHOD FOR INTERFERENCE DETECTION

CROSS-REFERENCE TO RELATED APPLICATIONS

This application claims the priority under 35 U.S.C. § 119 of European Patent application no. 17160370.7, filed on 10 Mar. 2017, the contents of which are incorporated by reference herein.

FIELD OF THE INVENTION

The field of the invention relates to a wireless communication unit to detect interference. The invention is applicable to, but not limited to, a millimetre wave (mmW) radar unit configured to detect interference by counting a number of times that a receiver is saturated to evaluate whether (or not) a received signal may be used.

BACKGROUND OF THE INVENTION

There has been an increased demand for active safety systems for vehicles. Active safety systems require multiple radar sensors per vehicle, each typically working with a specific radar technology. Currently, there are a handful of radar sensor technologies adopted and installed by leading vehicle manufacturers. The most popular radar technology supports the transmission, reception and processing of frequency modulated continuous wave (FMCW) radar signals. FMCW radar systems in automotive vehicles are typically used for detecting objects that are located in the vicinity of the motor vehicle, e.g. other vehicles or obstacles (e.g. when reversing). The data obtained in FMCW radar systems, with radar signals received from objects located around the vehicle, can be used to regulate automatic speed control of a motor vehicle as FMCW radar systems allow a speed and distance of an object to be determined. In addition, other known radar technologies include pulse mode continuous wave (PMCW) radar signals, frequency shift keyed (FSK) radar signals, pulse Doppler radar signals, ultra-wideband (UWB) impulse radar signals.

Since radar systems in general are based on the emission of electromagnetic waves, and the (processing of a) reflection of these emitted electromagnetic waves from objects, radar systems are susceptible to interference from environmental conditions, other radar systems, faulty radar components or circuits, etc. Thus, interference affects the sensitivity of a radar sensor, thereby restricting its performance capabilities or its detection range. Furthermore, interference may result in erroneous detection or even non-detection of objects.

In radar systems, the receiver of a radio unit is typically an UWB receiver. For this reason any unwanted signal that is received in the same receiver bandwidth will generate interference on the wanted (i.e. reflected) signal. If the signal of the interferer is not strong enough to saturate the receiver, it will still increase the noise floor of the system, and will therefore degrade the radar unit performance. If the signal power of the interferer is strong enough, it can saturate the receiver circuit(s), thereby reducing the likelihood of detecting targets. However, the inventors of the present invention have recognised and appreciated that spurious, intermittent, interfering signals may also cause significant performance degradation, as known interference detection methods are unable to identify and/or manage such interference.

EP 2549292 A1 describes a FMCW radar system and interference detection method for FMCW radar systems that solely uses a power threshold to detect interference. Hence, the teaching of EP 2549292 A1 is unsuitable for spurious interfering signals. US 2007/0018886 A1, titled 'Interference determination method and FMCW radar using the same', describes a mechanism whereby the variance of a sample of a beat signal is used as an indication of the interference. This suggested approach requires extra power computation on the digital signal processing unit, thereby increasing costs and required computation resources.

It is desirable to develop a radar unit that is less susceptible to, or better able to detect, such interference, and particularly spurious or intermittent interference, at an acceptable performance level and cost.

SUMMARY OF THE INVENTION

The present invention provides a wireless communication unit, such as a radar unit, an interference detection circuit and methods of interference detection, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
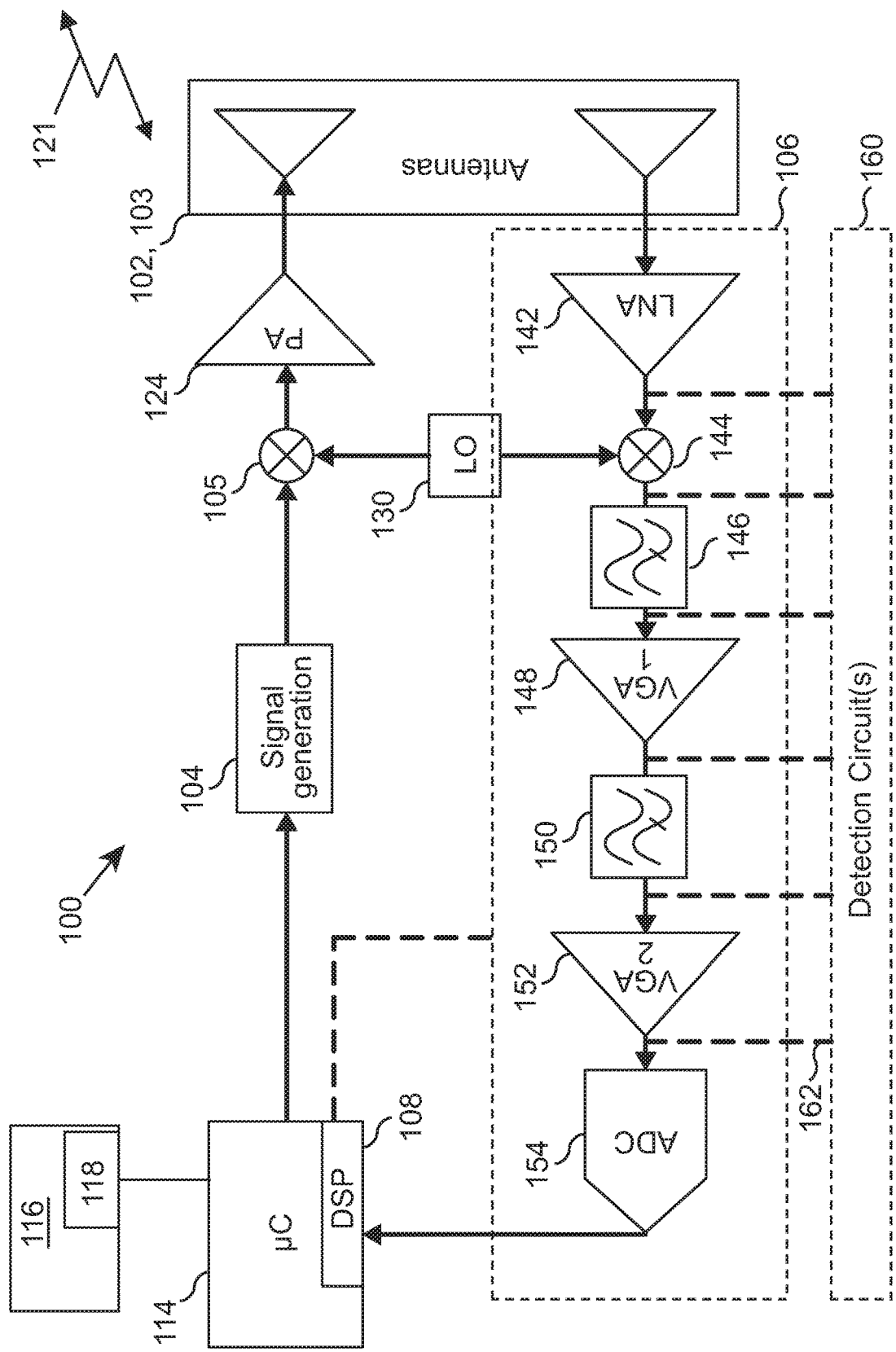
FIG. 1 illustrates a block diagram of a wireless communication unit, such as a radar unit, adapted according to example embodiments of the invention.

The inventors of the present invention have recognized and appreciated that it would be advantageous to develop a radar unit design that better detects interference and determines a suitable course of action in response thereto, Examples of the invention are described with reference to the fact that, in a radar system, the signals reflected from real targets have a very low power. However, signals coming from an interferer will typically be much larger and exceed a power threshold, at least during some stages of the radar receiver. However, if the interferer exceeds the power threshold at the receiver only during a relatively short amount of time, the interference may be discarded and the targets may still be detected with a very good probability. Thus, examples of the invention utilise this appreciation that not all received high-level signals exceeding a power threshold will degrade the performance of the sensor in a severe way that jeopardises the whole radar measurement. In contrast, the inventors of the present invention have recognized and appreciated that only the interferer that exceeds a particular power threshold during a determined amount of time, or repeated over a certain time period, has to be taken into account.

Examples of the invention are described with reference to a communication unit, such as a radar unit, that includes a power threshold circuit, a counter, such as a digital counter that employs a threshold and a simplified mechanism to indicate interference, such as a binary flag in a real-time manner. Although examples of the invention are described with reference to a these components and circuits, it is envisaged that the concepts herein described may be implemented in any suitable manner and using any suitable circuits and components. In some examples of the invention, every time a saturation event occurs over a period of time, say following a power threshold being exceeded, the counter will be incremented. In some examples, the period of time being considered is a radar cycle or a communication cycle. If the counter reaches the threshold in a defined time, the interference indicator, such as a binary flag will be set to '1' indicating the detection of interference that is deemed will impact the receiver measurement.

The interference detection and identification mechanisms described herein are applicable to any wireless communication unit with a receiver that is susceptible to interference, such as mobile phones, mobile or portable radios, etc. Notwithstanding this general applicability across a wide range of wireless communication technologies, examples of the invention are herein described with reference to a radar unit that supports, in a real-time manner, at least one of the following radar operation principles: frequency modulated continuous wave (FMCW) radar, pulsed modulated continuous wave (PMCW), frequency shift keyed (FSK), ultra-wideband (UWB) impulse radar, digitally modulated radar, automotive radar, bioradar, etc.

A first aspect of the invention describes a wireless communication unit that includes: at least one receiver configured to receive a radio frequency signal on at least one receiver channel and comprising a plurality of receiver circuits; at least one interference detection circuit coupled to an output of at least one of the plurality of receiver circuits and configured to detect a saturation event of a signal output from at least one of the plurality of receiver circuits; and a controller configured to identify interference in a received signal. The at least one interference detection circuit includes at least one counter configured to count a number of saturation events in at least one of the plurality of receiver circuits over a time limited period; and at least one comparator coupled to the counter and configured to compare a count value of the number of saturation events from the counter with a counter threshold to indicate a presence of interference in the signal, when the counter threshold is exceeded. In this manner, following a repeated detection of a saturation event, a spurious interference (such as an interferer that causes a repeated temporary saturation event of a receiver circuit), may be detected. Thus, some examples, a count related to a number of detected saturation events over the time limited period may facilitate detection of spurious interference.

Notably, in some examples, the indicating of a presence of interference in the signal output from one of the plurality of receiver circuits based on a repeated detection of the saturation event over a time limited period, utilises both power or voltage measurements, in a form of determining a saturation event, as well as a time-based/time-constrained determination by detecting a repeated occurrence of the saturation event over a time-limited period. Although some examples of the time-limited period propose a counter that uses 22 bits to count a number of saturation events, it is envisaged that, in other examples, a different number of 'N' bits, as well as a different time-limited period, may be supported.

In some examples, the counting of a number of saturation detection events across multiple receiver stages and/or across multiple receiver channels may be performed by one or multiple counters, where a single counter may be used to count the number of saturation events in a single receiver channel or across a single stage covering multiple receiver channels. In the example described herein, a single counter is provided on each receiver stage, for each receiver channel. In some examples, different counter thresholds may be used per different receiver stage, for example in a situation where a particular receiver stage is more sensitive than others and therefore may have a lower count threshold. In some examples, the at least one interference detection circuit may be coupled to a timer that is configured to set the time limited period over which the interference is detected and/or track a radar cycle or communication cycle. In this manner, a pure power versus threshold determination of interference is avoided.

In some examples, a power or voltage sensor is coupled to at least one of the plurality of receiver circuits and configured to detect a power or voltage of the received signal wherein a determination of a saturation event is based on whether the detected power or voltage of the received signal exceeds a programmable power or voltage threshold, for example programmed by the controller. In this manner, a dynamic interference detection system may be supported, and may be adjusted 'on the fly'.

In some examples, a plurality of interference detection circuits, connected to a plurality of receiver stages, are each connected to combination logic in order to identify a saturation event in at least one of the plurality of receiver stages over the time limited period. In some examples, the combination logic may use an N-bit flag, where N is a number that is less than the plurality of interference detection circuits or the plurality of receiver stages. In some examples, the plurality of receiver circuits and/or receiver stages may be configured to have different programmable gains, such that, in response to an indication of the interference or an identification of a saturation event: the controller may perform at least one of the following: re-program at least one of the different programmable gains; turn off a receiver that has indicated the interference; turn off the wireless communication unit. In some examples, a plurality of parallel interference detection circuits may be connected to a plurality of receiver channels in order to identify a saturation event in at least one of the plurality of receiver channels over the time limited period. In this manner, a range of interference detection locations within the receiver may be supported. Furthermore, isolation of a particular interference problem may be identified and/or compensated for, due for example to a faulty internal component or circuit.

In some examples, the plurality of interference detection circuits may be coupled to an N-bit flag via, say, an 'OR' logic gate that is configured to indicate an interference upon a saturation event occurring in at least one receiver stage in at least one receiver channel. In some examples, the wireless communication unit may be a radar unit comprising at least one millimetre wave receiver circuit configured to operate in a 76-81 GHz communication frequency range.

In a second aspect of the invention, an interference detection circuit includes at least one interface for coupling to at least one receiver configured to receive a radio frequency signal on at least one receiver channel and includes a plurality of receiver circuits. The at least one interference detection circuit includes at least one counter configured to count a number of saturation events in at least one of the plurality of receiver circuits over a time limited period; and at least one comparator coupled to the counter and configured to compare a count value of the number of saturation events from the counter with a counter threshold in order to indicate a presence of interference in the signal, when the counter threshold is exceeded.

In a third aspect of the invention, a method of interference detection is described. The method includes: receiving a radio frequency signal on at least one receiver channel; detecting at least one saturation event of a signal output from at least one of a plurality of receiver circuits; counting a number of saturation events in the at least one of the plurality of receiver circuits over a time limited period; and comparing a count value of the number of saturation events with a counter threshold to indicate a presence of interference in the signal, when the counter threshold is exceeded.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

FIG. 1 illustrates a diagram of a wireless communication unit, adapted according to example embodiments of the invention. Purely for explanatory purposes, the wireless communication unit is described in terms of a radar unit 100 operating at millimetre (mmW) frequencies. The radar unit 100 contains one or several antennas 102 for receiving radar signals 121, and one or several antennas 103 for transmitting radar signals, with one shown for each purpose for simplicity reasons only. The number of antennas 102, 103 used may depend on the number of radar receiver and transmitter channels that are implemented in a given radar unit. One or more receiver chains, as known in the art, include receiver front-end and intermediate or baseband circuitry 106, effectively providing reception, low noise amplification (LNA) 142, frequency conversion 144, filtering 146 and intermediate or base-band amplification, and finally analog-to-digital conversion (ADC) 154. In some examples, a number of such circuits or components may reside in a signal processing circuit, dependent upon the specific selected architecture. In this example, the receiver circuitry further includes intermediate or baseband circuits that includes a low-pass filter 146, a first variable gain amplifier 148, a second low-pass filter 150 (to filter any harmonics of the output of the first variable gain amplifier 148) and a second variable gain amplifier 152. The output of the second variable gain amplifier 152 is input to the ADC 154 configured to convert the received analog radar signals to a digital form for processing by a digital signal processor 108.

In accordance with examples of the present invention, a plurality of individual circuits of the receiver front-end and intermediate or baseband circuitry 106 have been adapted to include, or be connected to 162, respective interference detection circuits 160. The respective interference detection circuits 160 are each configured to count a number of times that a received signal at the receiver (or in this case received at that particular detector circuit on that particular receiver channel) exceeds a power threshold over a time limited period. In some examples, the respective interference detection circuits may be operable over one or more receiver chains.

The receiver front-end and intermediate or baseband circuitry 106 is coupled to a microcontroller 114 and signal processing circuit (generally realized by a digital signal processor (DSP) 108). A skilled artisan will appreciate that the level of integration of receiver circuits or components may be, in some instances, implementation-dependent. The microcontroller 114 maintains overall operational control of the radar unit 100, and in some examples may comprise time-based digital circuits (not shown) to control the timing of operations (e.g. transmission or reception of time-dependent signals generated in signal generation circuit 104, such as: FMCW modulation generated signals, PMCW generated signals, FSK generated signals, UWB impulse radar generated signals, automotive radar generated signals, bioradar generated signals, etc.) within the radar unit 100. The microcontroller 114 is also coupled to the receiver front-end and intermediate or baseband circuitry 106 and the DSP 108. In some examples, the microcontroller 114 is also coupled to a timer 116 that includes a counter 118.

As regards the transmit chain, this essentially comprises a power amplifier (PA) 124 coupled to the transmitter's one or several antennas 103, antenna array, or plurality of antennas. In radar unit 100, radar transceiver topology is different from traditional wireless communication architectures (e.g. Bluetooth™, WiFi™, etc.), as modulation typically occurs within a phase locked loop (PLL) (say, via a fractional-N divider), and is applied directly to the PA 124. Therefore, in some examples, the receiver front-end and intermediate or baseband circuitry 106 and transmitter PA 124 are coupled to frequency generation circuit 130 arranged to provide local oscillator (LO) signals. The generated local oscillator signals are thus modulated directly to generate transmit radar signals, and also used to down-convert received modulated radar signals to a final intermediate or baseband frequency or digital signal via down-mixer 144 for processing in a receive operation.

Figure 2:
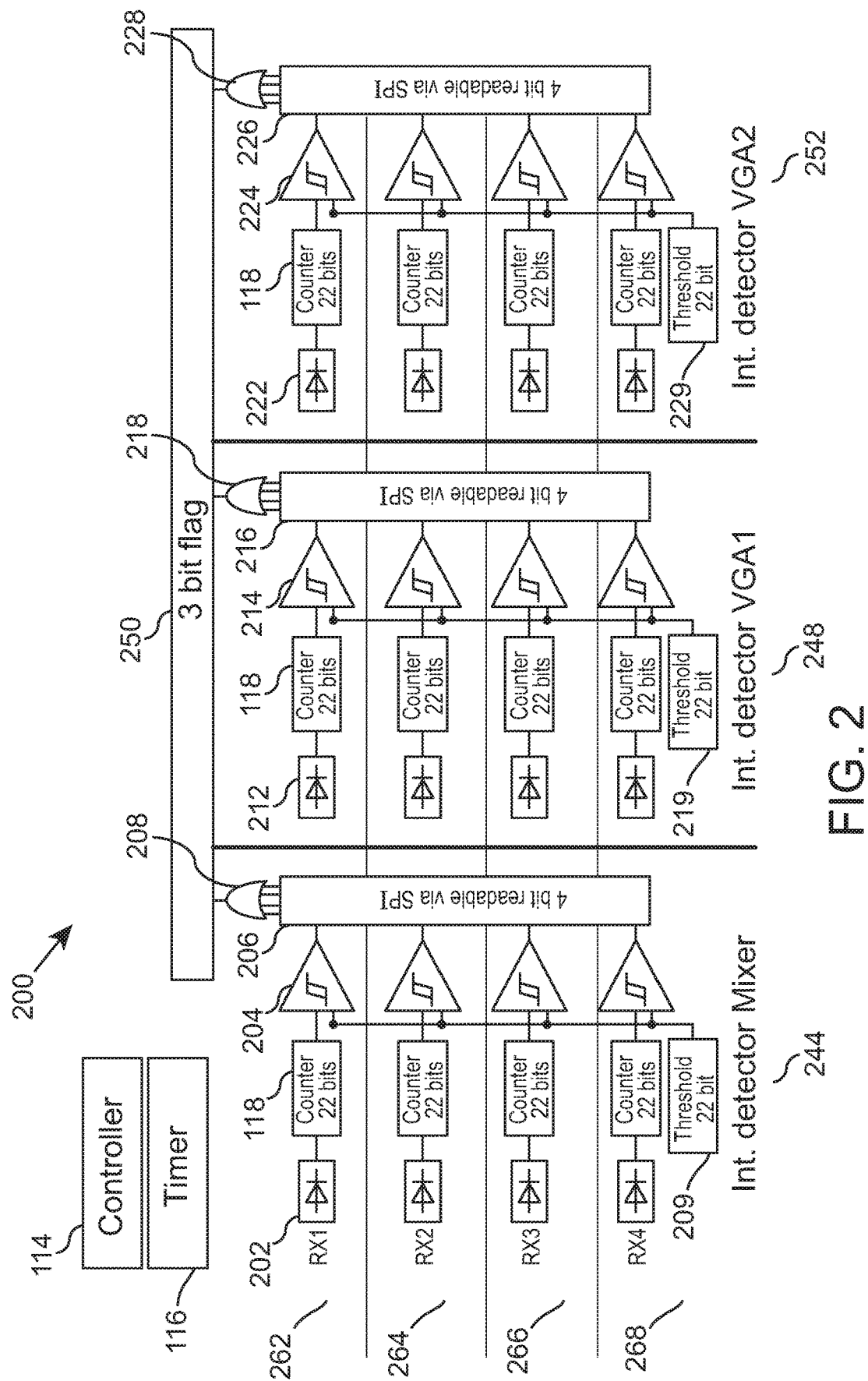
FIG. 2 illustrates a first example circuit diagram of an interference detection circuit in a receiver with four channels and three signal processing stages, according to example embodiments of the invention.

Referring now to FIG. 2, a first example detailed circuit diagram 200 of a series of interference detection circuits in a receiver is illustrated, according to example embodiments of the invention. In this example, the series of interference detection circuits in a receiver is illustrated with four receiver channels 262, 264, 266, 268, with interference detection circuits being applied to three individual receiver stages. In this example, a first interference detection circuit 244 may be connected to a mixer, such as down-mixer 144 of FIG. 1, a second interference detection circuit 248 may be connected to a first variable gain amplifier (VGA), such as first VGA 148 of FIG. 1, and a third interference detection circuit 244 may be connected to a second VGA, such as second VGA 252 of FIG. 1. In other examples, the interference detection circuits may be applied to any number of receivers and applied to any number of individual receiver stages that may be susceptible to saturating based on the level of the received signal.

The first example circuit diagram 200 includes the microcontroller 114 and a timer 116 configured to determine the performance of the radar unit, in response to the level of the received signal(s). Each interference detection circuit 244, 248, 252 is coupled to a 3-bit flag 250, in this example, and is respectively configured to trigger one of the flags in response to a saturation condition determination from their respective detection circuit 244, 248, 252.

Each interference detection circuit 244, 248, 252 includes a series of inter-connected circuits and components, per receiver channel 262, 264, 266, 268 that is being monitored. The series of inter-connected circuits and components include a saturation detector 202, 212, 222 that, in some examples, includes a power or voltage sensor, configured to sense a received signal level in terms of power or voltage, coupled to a power/voltage comparator that is configured to compare the sensed power or voltage to a power or voltage threshold. A digital counter 118 is connected to each saturation detector 202, 212, 222 and configured to count a period of time that the sensed power or voltage exceeds the power or voltage threshold. In this example, a N-bit digital counter, and specifically in FIG. 2 a 22-bit digital counter 118, is used. The output of the 22-bit digital counter 118 is input to a respective comparator 204, 214, 224, where the respective digital count value is compared to a programmable threshold 209, 219, 229 for the respective counter 118, to determine whether the number of saturation events has caused the counter to increase and exceed a threshold. In some examples, the user can set a threshold, which will be compared to a count of a number of saturation events. When using an N-bit counter, the threshold may be set to be any number between 1 and 2^n. Only when a result of the comparison is positive (counter threshold), will the saturation event be indicated.

In this example, the comparators 204, 214, 224 from each of the respective four receivers outputs therefore provide an output to combinational logic, which in this example includes a 4-bit serial to peripheral interface (SPI) that has the four-bits coupled to a respective 'OR' gate 208, 218, 228 per interference detection circuit 244, 248, 252. In this manner, when one or more of the receiver circuits receives a radar signal that saturates (as identified by the respective power or voltage sensor coupled to a power/voltage comparator) the circuit or component for a sufficiently long time, or repeatedly over this time if a either a spurious interferer or intermittent saturation event occurs, the respective output of the 22-bit digital counter 118, when compared with the programmable threshold 209, 219, 229, respectively identifies the saturation event. A plurality of these outputs from the respective comparators 204, 214, 224 is fed into a respective 'OR' gate 208, 218, 228, per interference detection circuit 244, 248, 252. Should any one (or more) of these interference detection circuits 244, 248, 252 trigger a 'high' output from the respective 'OR' gate 208, 218, 228, a binary flag is raised in N-bit flag 250, which in this example is a 3-bit flag. Thus, in this example, a plurality of interference detection circuits 244, 248, 252, connected to a plurality of receiver stages, are each connected to combinational logic to identify a saturation event in at least one of the plurality of receiver stages over the time limited period using an N-bit flag 250, where N is less than the number of the plurality of interference detection circuits across the plurality of receiver stages.

In some examples, the timer 116 may be used in order to determine a number of saturation events in a determined period of time, as well as set a time limit over which the interference has to be detected. In some examples, the microcontroller 114 (or DSP 108 from FIG. 1) is configured to control the operation of the radar unit 200 in response to a 'raised flag', within the N-bit flag 250, following an interference being detected in in one or more of the receiver channels by one or more of the interference detection circuits over a defined period of time. In this manner, a significant benefit of the circuit of FIG. 2 is that the radar unit 200, itself, is able to detect interference without the need of a specialist detector and processing unit.

In accordance with some examples of the invention, it is envisaged that one or more interference detection circuits may be placed at different stages of the receiver chain. In this manner, there are at least two reasons to place saturation detectors at a number of different stages of the receivers, and in a number, or all, of the receiver channels. First, in one example, each of the receiver stages is configured to have different programmable gains, depending on the power of the interferer and the programmed gain of the different stages, wherein the programmed gain is adjusted according to the identification of a saturation event. Thus, in some instances, it is possible that only the last stage of the receiver will be saturated, and it will still be detected. Secondly, due to safety reasons, if only one stage in one channel is saturated, it may be caused by a malfunction of the system, i.e. any (potentially other) part of the radio unit. In some instances, the malfunction may be correctable or the data discarded dependent upon where the saturation is detected. In accordance with some examples of the invention, it is envisaged that detectors may be placed in a plurality of receiver channels because an interference may be present in only one of the channels. For example if some channels are used to monitor azimuth and others can be used for elevation detection only one (or more) channels may need to be disabled. In accordance with some examples of the invention, it is envisaged that detectors may be placed in a plurality of receiver channels in order to determine whether one of the stages is entering into saturation. This can help to indicate if the variable gain of one or more of the different receiver stages has to be reduced. In accordance with some examples of the invention, it is envisaged that a radar unit user is provided with the opportunity to select one of two options, namely: detect and repair (detect an interference and compensate) or discard the data.

Thus, in this example, and for each stage, one threshold is used for each of the counters across all of the respective supported receiver channels. Also, in this example, for each stage and receiver channel there is one binary flag used to indicate a detection of interference. In each stage, an 'OR' logic gate collates the respective comparator outputs flags into one binary flag. In this manner, the microcontroller 118 (or user) only has to monitor a 3-bit flag to detect interference across 3 stages, even though in this example of 4 receiver channels, one or the 12 interference detection circuits may trigger one of the 3 flags.

Figure 3:
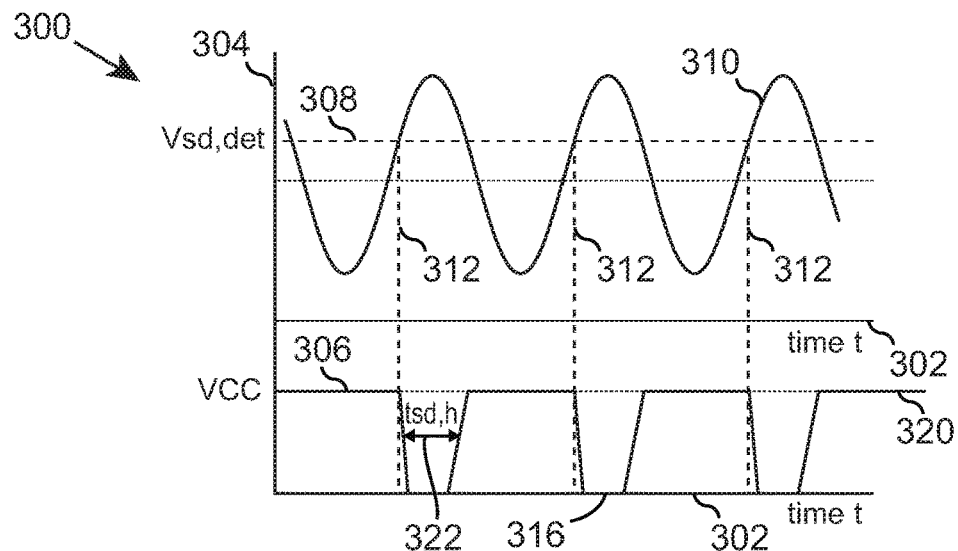
FIG. 3 illustrates an example behaviour of a power/voltage comparator used in the radar unit of FIG. 1, according to example embodiments of the invention.

Referring now to FIG. 3, a graphical example 300 of a behaviour of a power/voltage comparator used in the radar unit of FIG. 1 is illustrated, according to example embodiments of the invention. The graphical example 300 illustrates a received signal 310 versus time 302. As shown, the received signal 310 intermittently exceeds a power/voltage saturation threshold level 308. When the power or voltage threshold 308 is exceeded, at time 312, the comparator output 320 will change from a '1' 316 to a '0' 306, identifying a saturation event. A length of time that the saturation event is occurring for, e.g. time saturation detection high (tsd,h 322) requires a minimum time before it is acknowledged, and the repeated occurrence over a sufficient duration/time limited period confirms the saturation event.

Whilst a counter, such as counter 118 from FIG. 1 and FIG. 2, is connected to the timer and does not exceed a threshold, a decision is that no interference was detected. In accordance with example embodiments, a timer, such as timer 116 from FIG. 1 and FIG. 2, will be incremented each time that a whole radar cycle or communication cycle is completed. At this time, the counter will be reset to 'zero'. If the counter achieves or exceeds the value of the counter threshold, a decision is made that interference is detected and the data of the radar sensed circuit or receiver channel cannot be used.

Figure 4:
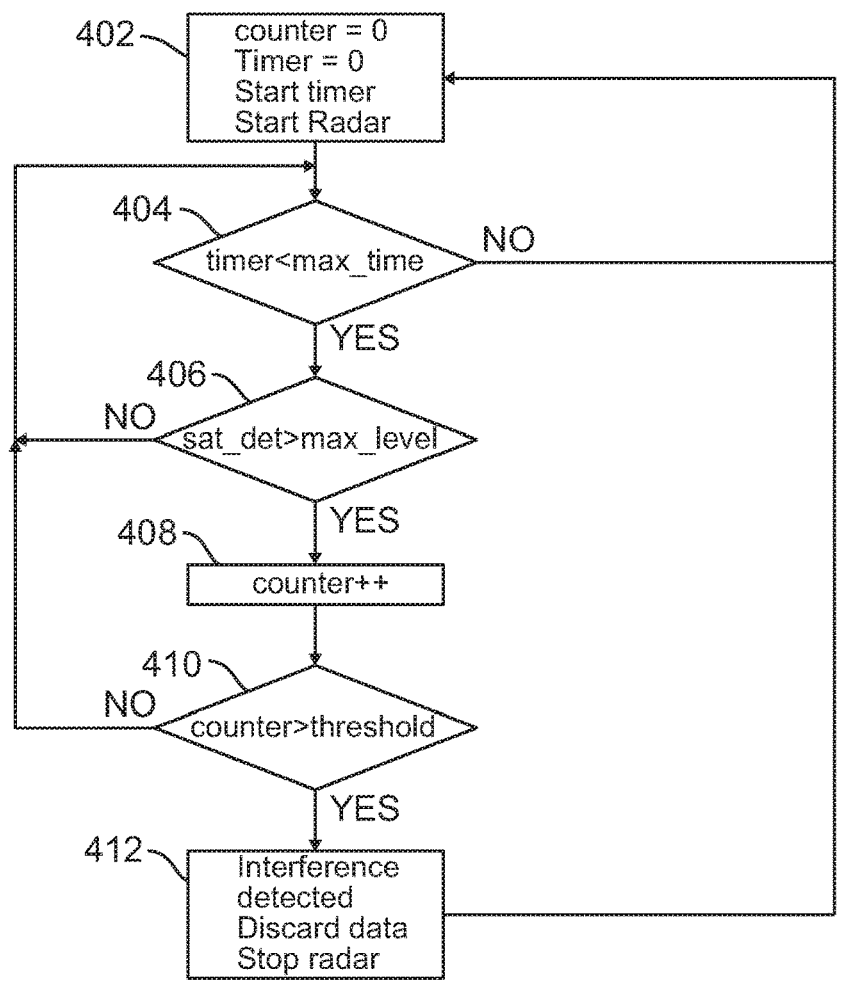
FIG. 4 illustrates a flow chart of a first example of an interference detection process for the radar unit of FIG. 1, according to example embodiments of the invention.

FIG. 4 illustrates a flow chart 400 of a first example of an interference detection process for the communication unit, e.g. radar unit of FIG. 1, according to example embodiments of the invention. The flow chart 400 starts at 402 with a counter, such as counter 118 from FIG. 1 and FIG. 2, being set to 'zero'; a timer, such as timer 116 from FIG. 1 and FIG. 2, being set to 'zero' and the radar unit and the timer started. At 404, a determination is then made as to whether (or not) the timer has reached a threshold. If the timer has reached a threshold at 404, then the flowchart 400 loops back to 402 and the timer and counter are reset to 'zero'. If the timer has not reached a threshold at 404, then the flowchart 400 moves to 406, where a determination is made as to whether (or not) a saturation event has occurred, e.g. the detected receive signal level at the respective detector (from the plurality of detectors) on the respective receiver channel, is greater than a (maximum) saturation threshold level, such as power/voltage saturation threshold level 308 of FIG. 3. If the determination at 406 is that the respective detected receive signal level has not exceeded the saturation detection threshold level, the process loops to 404. However, if the determination at 406 is that the respective detected receive signal level has exceeded the saturation detection threshold level, the process moves to 408 where the counter is incremented. The flowchart then moves to 410, where a determination is made as to whether the saturation event counter has exceeded a counter threshold. If the counter has not exceeded a counter threshold at 410, the flowchart 400 loops to 404. However, if the counter has exceeded the counter threshold at 410, the flowchart 400 results in a decision that interference has been detected at 412. At 412, the decision may result in either the data being discarded or one or more circuits or components or receiver channels being disabled, or that the radar unit is turned 'off'.

Figure 5:
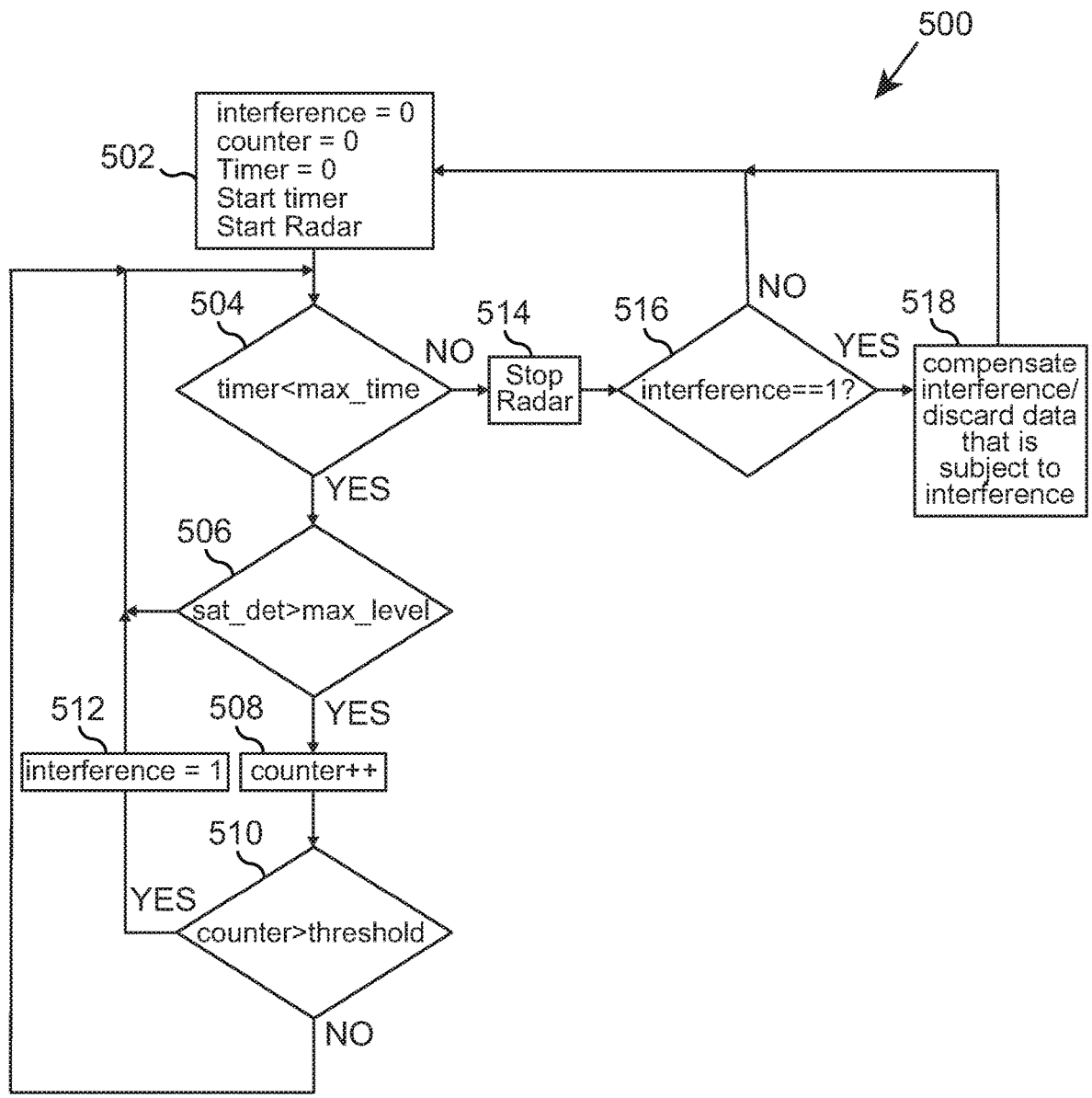
FIG. 5 illustrates a flow chart of a second example of an interference detection process for the radar unit of FIG. 1, according to example embodiments of the invention.

Referring now to FIG. 5, a flow chart 500 of a second example of an interference detection process for the radar unit of FIG. 1 is illustrated, according to example embodiments of the invention. The flow chart 500 starts at 502 with no interference; a counter, such as counter 118 from FIG. 1 and FIG. 2, being set to 'zero'; a timer, such as timer 116 from FIG. 1 and FIG. 2, being set to 'zero' and the radar unit and the timer and counter started. At 504, a determination is then made as to whether (or not) the tinier has reached a threshold, for example if the timer has reached the end of a radar cycle or a communication cycle. If the tinier has reached a timing threshold at 504, then the radar cycle or communication cycle has finished and the flowchart 500 moves to 514 and the radar is stopped. A determination is then made at 516 as to whether interference has been detected. If no interference has been detected at 516, the process loops to 502 and a new radar cycle or communication cycle is started. If interference has been detected at 516, then at 518 interference data that had been detected may either be discarded, or the interference may be compensated for, for example by adjusting one or more programmable gain stages of an affected receiver stage, such that subsequent received signals are no longer amplified as much and therefore do not saturate the receiver stage. Thereafter, the flowchart 500 then loops to 502 and a new radar cycle or communication cycle is started.

If the timer has not reached a timing threshold at 504, then the flowchart 500 moves to 506, a determination is made as to whether (or not) the detected receive signal level at the respective detector (from the plurality of detectors) on the respective receiver channel, is greater than a (maximum) saturation threshold level, such as power/voltage saturation threshold level 308 of FIG. 3. If the determination at 506 is that the respective detected receive signal level has not exceeded the saturation detection threshold level, the process loops to 504. However, if the determination at 506 is that the respective detected receive signal level has exceeded the saturation detection threshold level, the process moves to 508 where the counter is incremented. The flowchart then moves to 510, where a determination is made as to whether the saturation counter has exceeded a counter threshold. If the saturation counter has not exceeded a counter threshold at 510, the flowchart 500 loops to 504. However, if the saturation counter has exceeded the counter threshold at 510, the flowchart 500 results in a decision that interference has been detected at 512. Thereafter, the flowchart 500 then loops to 504.

There are several known techniques to cancel the unwanted radar signals. One technique would be to estimate the interferer signal (based on the type of interference, the length, the strength) and then subtract that signal from the received signal. Other techniques are published and described in 2015 IEEE MTT-S International Conference on Microwaves for Intelligent Mobility; titled: 'Automotive Radar Interference Mitigation by Reconstruction and Cancellation of Interference Component', by Jonathan Bechter, and Christian Waldschmidt from the Institute of Microwave Engineering, Ulm University, Germany; as well as 'A Method for Interference Cancellation in Automotive Radar', authored by Michael Barjenbruch, Dominik Kellner and Klaus Dietmayer from the Institute of Measurement, Control and Microtechnology, Ulm University.

Figure 6:
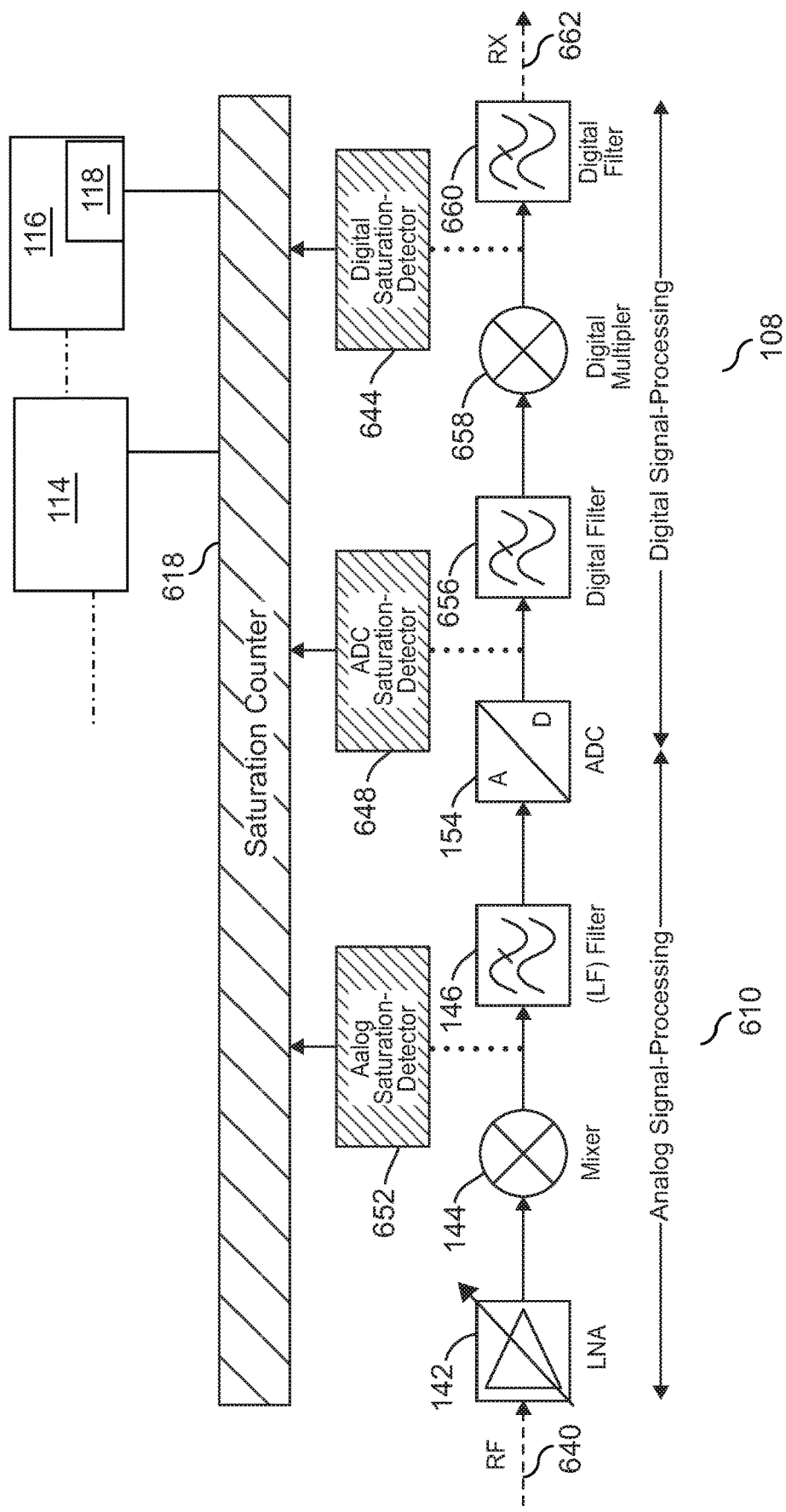
FIG. 6 illustrates a second example circuit diagram of an interference detection circuit in a receiver with four channels and three stages, according to example embodiments of the invention.

FIG. 6 illustrates a second example circuit diagram of an interference detection circuit in a receiver of a wireless communication unit, adapted according to example embodiments of the invention. Purely for explanatory purposes, the wireless communication unit is described in terms of a radar unit 600 operating at millimetre (mmW) frequencies, with only one receiver channel shown for clarity purposes. The radar unit 600 contains one or several antennas (not shown) for receiving radar signals.

One or more receiver chains, as known in the art, include receiver front-end and optionally intermediate or baseband circuitry, using analog signal processing 610, effectively providing reception of a radio frequency (RF) signal 640, low noise amplification (LNA) 142, frequency conversion 144, low-pass filtering 146 and intermediate or base-band amplification (not shown) in the analog domain. Finally, the analog processing is input to an analog-to-digital conversion (ADC) 154. Thereafter, in some examples, a number of further circuits or components may reside in digital signal processing circuit 108, dependent upon the specific selected architecture. In this example, the digital signal processing circuit 108 includes a digital filter 656, a digital multiplier 658, a second digital filter 660 (to filter any harmonics of the output of the digital multiplier 658). The output of the second digital filter 660 is a digital received signal (in a form of a digital representation of a received radar signal in this example) that is processed in a normal manner.

A skilled artisan will appreciate that the level of integration of receiver circuits or components may be, in some instances, implementation-dependent. The microcontroller 114 maintains overall operational control of the radar unit 600, and in some examples may comprise time-based digital circuits (not shown) to control the timing of operations (e.g. transmission or reception of time-dependent signals, such as: FMCW modulation generated signals, PMCW generated signals, FSK generated signals, UWB impulse radar generated signals, automotive radar generated signals, bioradar generated signals, etc.) within the radar unit 600. The microcontroller 114 is also coupled to the receiver front-end and intermediate or baseband circuitry 106 and the DSP 108. In some examples, the microcontroller 114 is also coupled to a timer 116 that includes a counter 118.

In accordance with some examples of the invention, it is envisaged that one or more interference detection circuits may be placed at different stages of the receiver chain, as in the first example of FIG. 2. In accordance with some examples of the invention, it is envisaged that detectors may be placed in a plurality of receiver channels in order to determine whether one of the stages is entering into saturation, although only one receiver channel is illustrated in FIG. 6 for clarity purposes only. This can help to indicate if the variable, and in some cases controllable, gain of the different stages has to be reduced (or not). In accordance with some examples of the invention, it is envisaged that a radar unit user is provided with the opportunity to select one of two options, namely: detect and repair (detect an interference and compensate) or discard the data.

In this example, interference detection circuits are applied to three individual receiver stages. In this example, a first interference detection circuit 652 is applied to a mixer output, such as an analog intermediate frequency or baseband output from down-mixer 144, a second interference detection circuit 648 is coupled to a digital output of the ADO 154, and a third interference detection circuit 644 is applied to an output of the digital multiplier 658. In other examples, the interference detection circuits may be applied to any number of receivers and applied to any number of individual receiver stages that may be determined as saturating, based on a level of the received signal at that particular location in the receiver. The three saturation detection circuits 652, 648, 644 in this example, are input to a saturation counter circuit 618 that is configured to determine whether a saturation of one or more circuits or components within the radar unit receiver has occurred.

In accordance with example embodiments, any number of saturation events can be monitored, e.g. caused by spurious signals, interfering signals. Advantageously, there is no necessity for additional signal processing to be included in the design, or retrospectively fitted, in order to detect interference. In some examples, the interference detection circuits may be built in a chip transceiver or in a chip receiver, without increasing significantly the chip area due to the simplicity of the proposed communication unit design. In systems where the signal processing circuit communicates via a low speed communication protocol with, say, the radar transceiver/receiver unit, the communication traffic is still low if the interference detection system is monitored with a flag based interference identification system.

Although examples of the invention are described with reference to a radar unit for an automotive safety system, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage,

The invention claimed is:

1. A wireless communication unit comprises:
   at least one receiver configured to receive a radio frequency signal on at least one receiver channel and comprising a plurality of receiver circuits, wherein
      each receiver circuit of the plurality of receiver circuits comprises
         a plurality of amplification stages, and
         an interference detection circuit, corresponding to each amplification stage of the plurality of amplification stages, coupled to an output of the corresponding amplification stage and configured to detect a saturation event of a signal output from the corresponding amplification stage, and
      each interference detection circuit comprises
         a saturation detector and a corresponding counter configured to count a number of saturation events in the corresponding amplification stage over a time limited period, and
         a comparator, coupled to the counter, and configured to compare a count value of the number of saturation events in the corresponding amplification stage with a counter threshold associated with the amplification stage, and in response thereto an output of the comparator is configured to indicate a presence of a spurious or intermittent interference in the signal received from a source external to the wireless communication unit in the amplification stage of the receive circuit over the time limited period when the counter threshold is exceeded; and
   a controller configured to identify interference in a received signal.

2. The wireless communication unit of claim 1 wherein the interference detection circuit is configured to determine the number of saturation events over the time limited period.

3. The wireless communication unit of claim 1 further comprising:
   a timer, coupled to the interference detection circuit, and configured to perform one or more of
      set the time limited period over which the interference is detected, and
      track a radar cycle or communication cycle.

4. The wireless communication unit of claim 1 wherein the saturation detector comprises a power or voltage sensor coupled to the output of the corresponding amplification stage and configured to detect a power or voltage of the received signal wherein a determination of a saturation event is based on whether the detected power or voltage of the received signal exceeds a programmable power or voltage threshold.

5. The wireless communication unit of claim 1 wherein each interference detection circuit is connected to combination logic to identify a saturation event in at least one of the plurality of amplification stages over the time limited period.

6. The wireless communication unit of claim 5 wherein each of the interference detection circuits is coupled to the N-bit flag via an 'OR' logic gate that is configured to indicate an interference upon a saturation event occurring in at least one amplification stage in at least one receiver channel.

7. The wireless communication unit of claim 5 wherein the plurality of amplification stages is configured to have different programmable gains in the plurality of receiver stages, such that, in response to an indication of the interference or an identification of a saturation event: the controller performs at least one of the following: re-program at least one of the different programmable gains; turn off a receiver that indicates the interference; turn off the wireless communication unit.

8. The wireless communication unit of claim 1 wherein the combination logic comprises an N-bit flag, where N is less than the number of interference detection circuits or the plurality of amplification stages.

9. The wireless communication unit of claim 1 wherein the wireless communication unit is a radar unit comprising at least one millimetre wave receiver circuit configured to operate in a 76-81 GHz communication frequency range.

10. An interference detection circuit coupled to an amplification stage of a plurality of amplification stages of a receiver circuit, a receiver configured to receive a radio frequency signal on at least one receiver channel and comprising a plurality of the receiver circuits, the interference detection circuit comprises:
    a saturation detector and a corresponding counter configured to count a number of saturation events in the amplification stage over a time limited period; and
    a comparator, coupled to the counter, and configured to compare a count value of the number of saturation events from the counter with a counter threshold associated with the amplification stage, and in response thereto an output of the comparator is configured to indicate a presence of a spurious or intermittent interference in the signal received from a source external to a wireless communication unit comprising the interference detection circuit over a time limited period, when the counter threshold is exceeded.

11. The interference detection circuit of claim 10 wherein the interference detection circuit is configured to determine the number of saturation events over the time limited period.

12. A method of interference detection, the method comprising:
    receiving a radio frequency signal on at least one receiver channel that comprises a plurality of receiver circuits each having a plurality of amplification stages;
    detecting at least one saturation event of a signal output from at least one of the amplification stages;
    counting a number of saturation events in the amplification stage over a time limited period; and
    comparing a count value of the number of saturation events with a counter threshold associated with the amplification stage, and in response thereto indicating a presence of a spurious or intermittent interference in the signal received from an external source in the amplification stage over the time limited period, when the counter threshold is exceeded.

13. The method of interference detection of claim 12 further comprising, following an indication of the presence of interference:
    discarding the data related to the detected interference.

14. The method of interference detection of claim 12 further comprising setting the time limited period over which the presence of interference in the signal is detected.

15. The method of interference detection of claim 12 further comprising determining a saturation event based on whether a detected power or voltage of the received radio frequency signal exceeds a programmable power or voltage threshold.

16. The method of interference detection of claim 12 further comprising coupling a plurality of interference detection circuits to the plurality of receiver circuits to identify a saturation event in at least one of the plurality of receiver circuits over the time limited period.

\* \* \* \* \*